US011808396B2

(12) United States Patent
Garcia Ramirez et al.

(10) Patent No.: US 11,808,396 B2
(45) Date of Patent: Nov. 7, 2023

(54) HIGH THERMAL TOLERANCE FLEXIBLE SUPPORTS

(71) Applicant: Ford Global Technologies, LLC, Dearborn, MI (US)

(72) Inventors: Arturo Alberto Garcia Ramirez, Venustiano Carranza (MX); Ricardo Daniel Sanchez Lugo, Texcoco (MX); Cindy Barrera-Martinez, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 169 days.

(21) Appl. No.: 17/443,901

(22) Filed: Jul. 28, 2021

(65) Prior Publication Data

US 2023/0042142 A1 Feb. 9, 2023

(51) Int. Cl.
*F16L 57/04* (2006.01)
*F16L 55/035* (2006.01)
*B60R 16/02* (2006.01)
*F16L 57/06* (2006.01)
*F16L 55/033* (2006.01)

(52) U.S. Cl.
CPC .......... *F16L 57/04* (2013.01); *B60R 16/0215* (2013.01); *F16L 55/035* (2013.01); *F16L 55/0336* (2013.01); *F16L 57/06* (2013.01)

(58) Field of Classification Search
CPC ..... F16L 57/04; F16L 55/0336; F16L 55/035; F16L 57/06; B60R 16/0215
USPC ....................................................... 280/727
See application file for complete search history.

(56) References Cited

U.S. PATENT DOCUMENTS

| | | | | |
|---|---|---|---|---|
| 4,137,594 | A * | 2/1979 | Arnal | A46B 3/04 15/DIG. 3 |
| 4,584,330 | A | 4/1986 | Wason | |
| 2004/0127124 | A1* | 7/2004 | Hexels | F41H 3/02 442/131 |
| 2006/0108037 | A1* | 5/2006 | Manne | B60C 17/06 152/158 |
| 2006/0264566 | A1* | 11/2006 | Cassar | C08L 83/04 524/588 |
| 2013/0049455 | A1* | 2/2013 | Kim | B60L 3/0069 174/136 |
| 2018/0187018 | A1 | 7/2018 | Schmid et al. | |

(Continued)

FOREIGN PATENT DOCUMENTS

| | | |
|---|---|---|
| CN | 104071092 A | 10/2014 |
| CN | 109369958 A | 2/2019 |

(Continued)

OTHER PUBLICATIONS

Properties of Solids, http://webserver.dmt.upm.es/~isidoro/dat1/eSol.pdf (Year: 2012).*

(Continued)

*Primary Examiner* — Yi-Kai Wang
(74) *Attorney, Agent, or Firm* — Vincent Mastrogiacomo; McCoy Russell LLP

(57) ABSTRACT

Methods and systems are provided for a flexible support for a vehicle. In one example, the flexible support is formed of a composite material and configured to surround a vehicle component and absorb oscillations generated by the vehicle. The composite material may be a mixture of aluminum particles dispersed in an elastomer matrix.

18 Claims, 3 Drawing Sheets

(56) References Cited

U.S. PATENT DOCUMENTS

2018/0291782 A1* 10/2018 Edo .................... F01N 13/1822
2021/0262380 A1   8/2021 Garcia Ramirez et al.

FOREIGN PATENT DOCUMENTS

| JP | 2018051987 A | 4/2018 |
| WO | 0210265 A1 | 2/2002 |
| WO | 03076537 A1 | 9/2003 |

OTHER PUBLICATIONS

Nickel/Aluminum Conductive Flursoliicone Elastomer, https://www.majr.com/wp-content/uploads/2021/09/DS-10-6-19-fluorosilicone-Ni-Al-elastomer.pdf (Year: 2019).*

* cited by examiner

HIGH THERMAL TOLERANCE FLEXIBLE SUPPORTS

FIELD

The present description relates generally to flexible supports for vehicle components.

BACKGROUND/SUMMARY

Packaging space in vehicles is becoming increasingly constrained due to a demand for compact vehicles along with advances in vehicle technology which may lead to greater complexity of vehicle components. In vehicle regions prone to high temperatures, such as under-hood and underbody areas, a close proximity of vehicle components may subject components with low heat tolerance to elevated thermal stress. As a result, adaptation of such components to tolerate increased heat exposure is desirable to prolong operation and a useful life of the components.

For example, flexible supports, such as grommets and spacers, may be used to guide and maintain a positioning of cables and cable harnesses and shield pipes from direct contact with adjacent pipes, respectively. However, the flexible supports may be placed near the vehicle's engine due to tight packaging conditions which may lead to accelerated degradation of the flexible supports. For example, the flexible supports may be formed of a low cost rubber which may be prone to fatigue and deformation. However, use of a more heat resistant material such as silicone may be prohibitively costly.

Attempts to address degradation of flexible vehicle parts include using devices formed from a composite material. One example approach is shown by Chinese Patent No. CN109369958. Therein, aluminum nitride particles are included in an engine suspension rubber material. The aluminum nitride particles have high thermal conductivity, increasing heat conductivity out of the rubber material thereby suppressing heat accumulation in the rubber material. Inhibiting heat accumulation may reduce thermally-induced macromolecular chain breakage of the rubber polymers and increase resistance of the material to aging and fatigue.

However, the inventors herein have recognized potential issues with such systems. As one example, while increasing the thermal conductivity enhances heat conduction through the rubber material, the rubber polymers are nonetheless subjected to high temperatures. Increasing the thermal conductivity may reduce a residence time of heat within the rubber material but does not circumvent eventual thermal degradation of the rubber component of the composite material.

In one example, the issues described above may be addressed by a flexible support for a vehicle comprising a composite material forming the flexible support, the flexible support configured to at least partially surround a vehicle component and absorb oscillations generated by the vehicle. The composite material is a mixture of aluminum particles dispersed in an elastomer matrix. In this way, desirable physical properties of the elastomer matrix may be retained while increasing a thermal tolerance of the flexible support.

As one example, the flexible supports may be formed of micron-scale aluminum particles dispersed in the elastomer matrix. The elastomer matrix may be a low cost rubber with higher thermal absorptivity than the aluminum particles. The aluminum particles, having a lower thermal absorptivity, may provide a barrier to heat transmitted to the flexible supports via radiation from nearby heat-generating components. Absorption of heat by the elastomer matrix is thus reduced, allowing the flexible supports to maintain structural integrity for a prolonged period of time.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-3 are shown approximately to scale.

DETAILED DESCRIPTION

Figure 1:
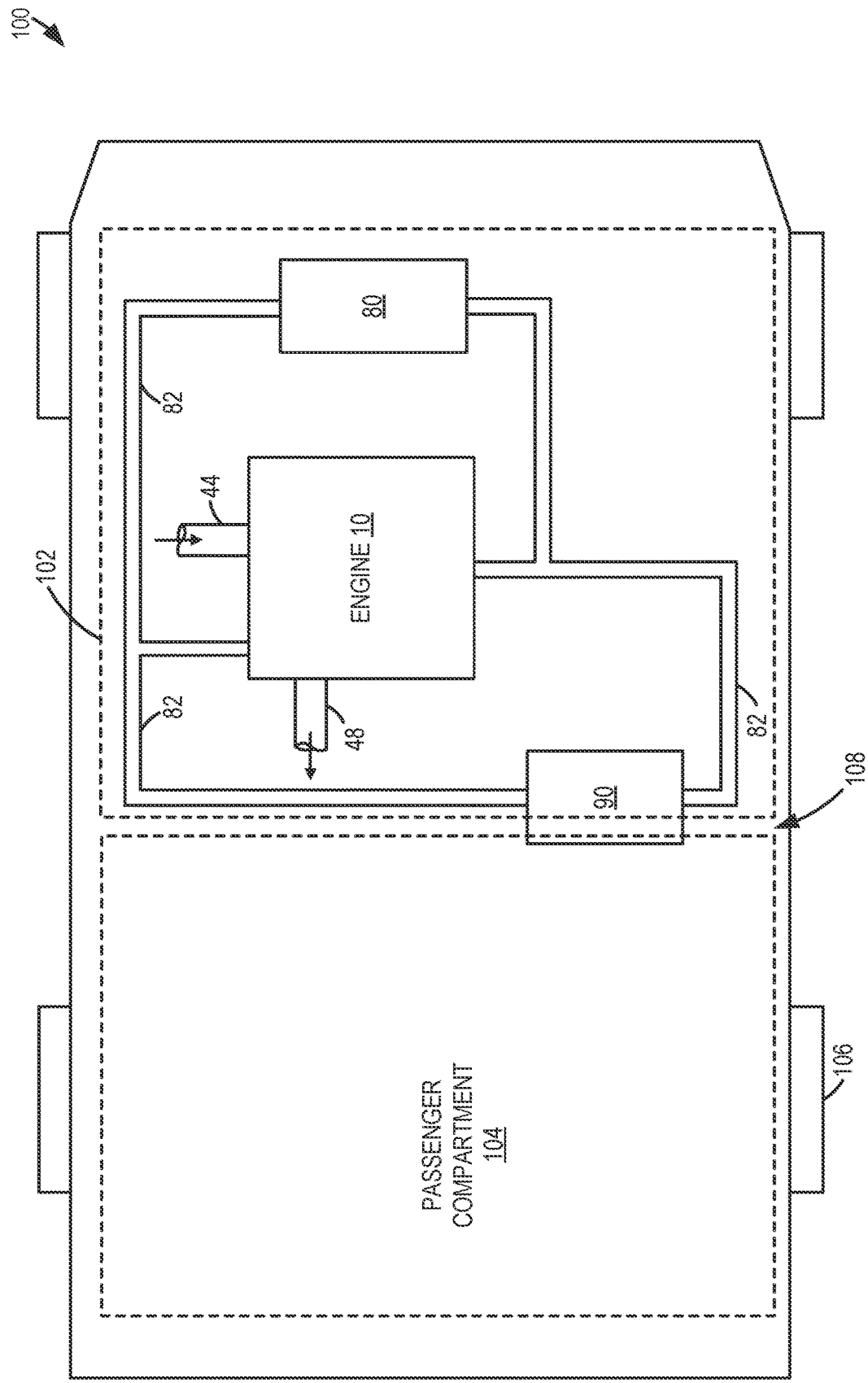
FIG. 1 shows a schematic diagram of vehicle, including an engine.
Figure 2:
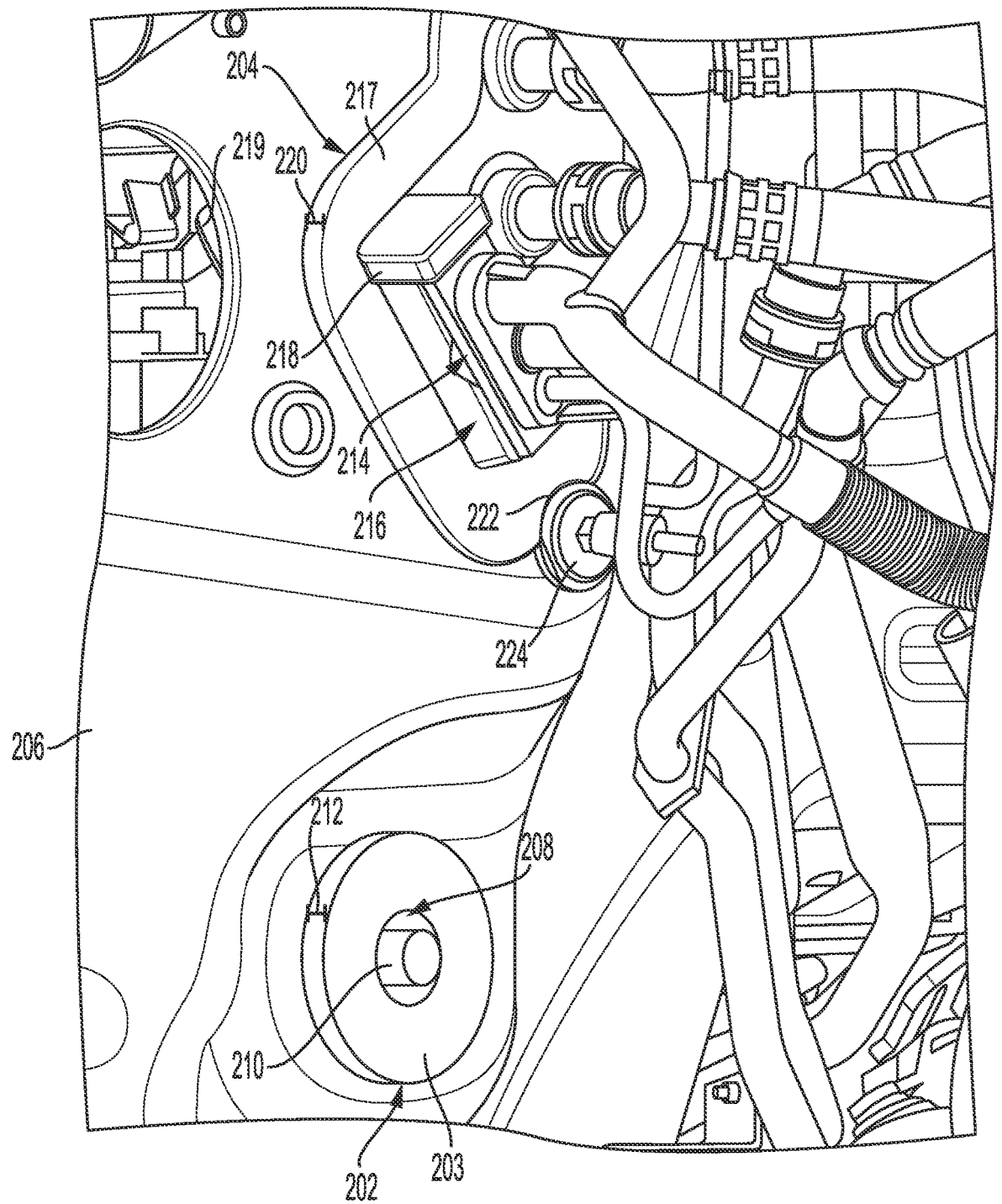
FIG. 2 shows a first example of a flexible support which may be positioned proximate to the engine of FIG. 1.
Figure 3:
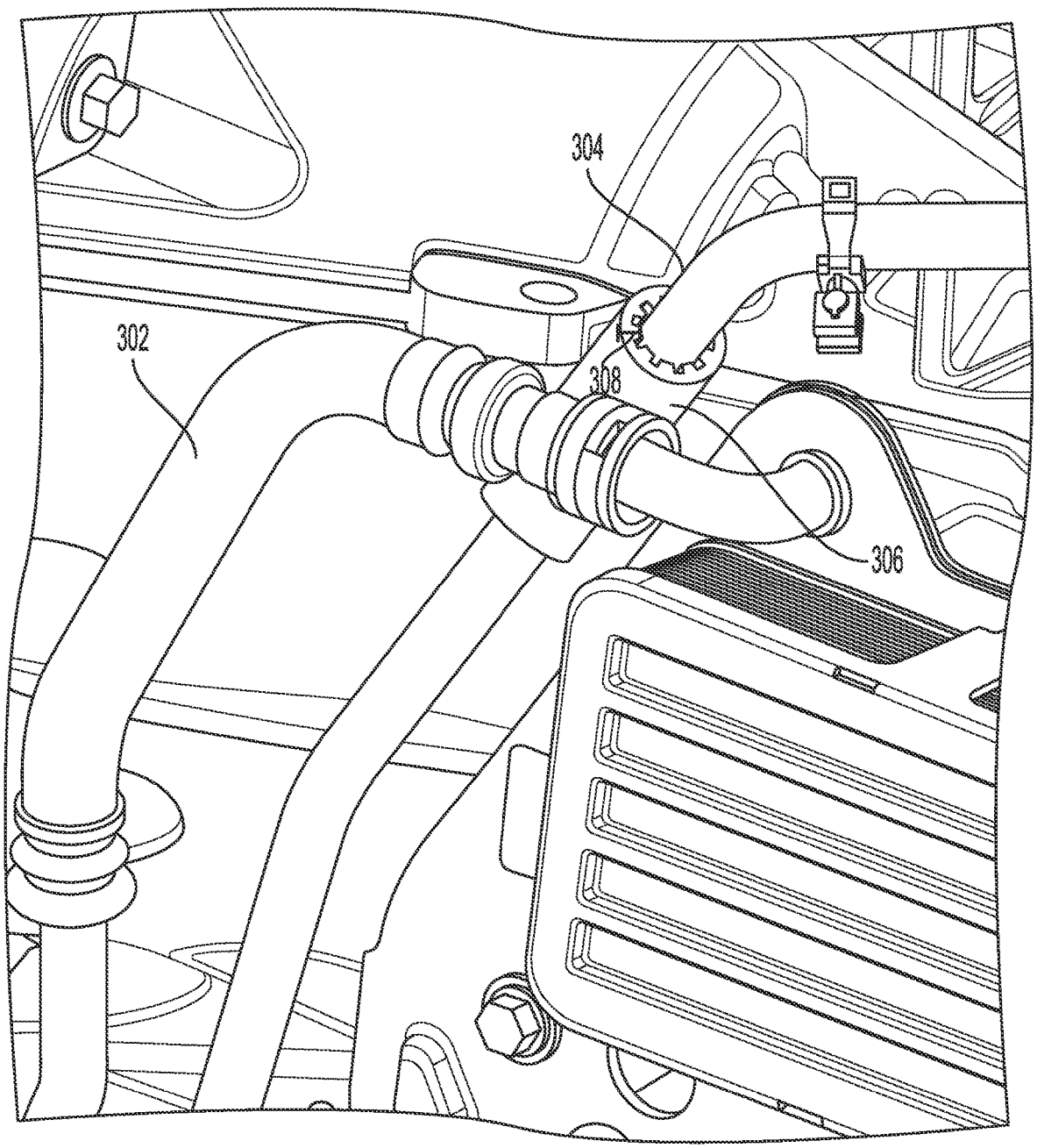
FIG. 3 shows a second example of a flexible support which may be positioned proximate to the engine of FIG. 1.

The following description relates to systems and methods for flexible supports for vehicles. The flexible supports may be supporting devices such as, for example, grommets and spacers used to support cables, cable harnesses, and pipes arranged in close proximity to a vehicle engine. A schematic diagram of an engine system is shown in FIG. 1 which includes components prone to producing heat during vehicle operation. As one example, cable harnesses may be routed between an under-hood region and a cabin of a vehicle through grommets, examples of which are depicted in FIG. 2. An example of a spacer used to isolate a pipe from an adjacent pipe is shown in FIG. 3. It will be appreciated that the examples shown in FIGS. 2 and 3 are non-limiting examples of flexible supports and other examples may include variations in geometry, placement, application, etc.

FIGS. 2-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Composite materials are made from two or more constituents, or parent materials having different physical and/or chemical properties. When the parent materials are combined, a hybrid material is formed which has characteristics that are different from the parent materials. For example, elastomer composites may be a mixture of an elastomer substrate, such as natural rubber, chloroprene, ethylene propylene diene monomer, polysiloxane, etc., and a material with reinforcing qualities, such as higher strength, stiffness, heat resistance, etc. In one example, the reinforcing material may be a metal, such as aluminum or an aluminum alloy. The metal may be dispersed into the elastomer substrate as particles or fibers, for example, such that the metal remains distinct within the elastomer matrix.

Use of composite materials may be driven by a demand for a particular material profile. For example, composite materials may be stronger, lighter, more durable, have a specific thermal property, or reduce a cost relative to the individual parent materials by substituting an amount of a more costly material with a less costly one. As described herein, use of an elastomer or rubber composite to form flexible supports for a vehicle may provide suppressed thermal degradation of the flexible supports by inhibiting heat absorption at the flexible supports. Less heat is transferred from hot vehicle components to the flexible supports via radiation, reducing heating of the flexible supports to high temperatures. Further details of the rubber composite flexible supports are provided below, with reference to FIGS. 2 and 3.

Turning now to FIG. 1, a simplified example of a vehicle 100 is illustrated schematically. Vehicle 100 has drive wheels 106, a passenger compartment 104 (herein also referred to as a cabin), and an under-hood region 102 including an internal combustion engine 10. Internal combustion engine 10 has one or more combustion chambers which may receive intake air via intake passage 44 and may exhaust combustion gases via exhaust passage 48. Engine 10 as illustrated and described herein may be included in a vehicle such as an internal combustion engine vehicle or a hybrid electric vehicle, among other types of vehicles. While the example applications of engine 10 will be described with reference to a vehicle, it should be appreciated that various types of engines and vehicle propulsion systems may be used, including passenger cars, trucks, etc.

Engine 10 may be fluidically coupled to a radiator 80 and a heater core 90 by coolant lines 82. Heat generated at engine 10 may be absorbed by coolant in the coolant lines 82 and exchanged at the radiator 80 and/or the heater core 90. The under-hood region 102 may include numerous other components, some of which may release or absorb heat, and may demand a compact arrangement of the components within the under-hood region 102. As a result, many of the components may be positioned within close proximity of heat-generating parts, such as engine 10 or the heater core 90, including connective components such as pipes used to conduct fluids therethrough, and electrical cables and wires connecting electrical components of the vehicle 100.

For example, the heat-generating parts or devices of the vehicle in the under-hood region 102 may be packaged sufficiently near the passenger compartment 104 such that heat from the heat-generating parts may radiate to an interfacing region 108 between the under-hood region 102 and the passenger compartment 104. The interfacing region 108 may include a dashboard and at least a portion of a floor of the passenger compartment 104. In some examples, cable harnesses and electrical connectors may extend through the interfacing region 108 to electrically connect electronic displays and outputs at the dashboard to electronic components located in the under-hood region 102 or an underbody region (not shown) of the vehicle 100. Extension of the cable harnesses and electrical connectors through the interfacing region 108 may be supported by flexible spacers such as grommets, as illustrated in FIG. 2.

Turning to FIG. 2, examples of a first grommet 202 and a second grommet 204 are shown coupled to a dashboard 206 of a vehicle, such as the vehicle 100 of FIG. 1. It will be appreciated that the grommets shown in FIG. 2 are non-limiting examples and a variety of alternative shapes, textures, sizes, etc., of the grommets are possible. The first grommet 202 may be a continuous structure with a portion shaped as a flat ring 203 that is co-planar with a surface of the dashboard 206. A tubular section may extend from the flat ring 203, in a direction perpendicular to the surface of the dashboard 206, through a corresponding aperture in the dashboard 206 along a central opening 208 of the first grommet 202. In some examples, an inner surface of the tubular section may be texture to increase friction between the first grommet 202 and an electrical connector 210 inserted therethrough. In one example, the tubular section may couple the flat ring 203 to a similarly shaped flat ring arranged on an opposite surface of the dashboard, thereby maintaining a position of the first grommet 202 within the aperture of the dashboard 206. Each portion of the first grommet 202, e.g., the flat rings and tubular section, may have a thickness 212 that is similar to or less than a thickness a material of the dashboard, for example. In other words, the first grommet 202 is formed of a thin sections of a flexible, deformable material.

As shown in FIG. 2, the electrical connector 210 may be inserted through the central opening 208 of the first grommet 202. The electrical connector 210 may be formed of a rigid, electrically conductive material, such as a metal, and a circumferential surrounding of the electrical connector 210 by the first grommet 202, such that the tubular section of the first grommet 202 is in face-sharing contact with an outer surface of the electrical connector 210, may shield the electrical connector 210 from wear resulting from contact between the material of the dashboard 206 and the electrical connector 210. The first grommet 202 may be configured to be more flexible and deformable than either of the material of the dashboard 206 or the electrical connector 210 and may absorb oscillating motions from both the dashboard 206 and the electrical connector 210. Furthermore, the first grommet 202 may maintain a position of the electrical connector 210 in the dashboard 206 without subjecting the electrical connector 210 to contact with hard surfaces. In addition, in some examples, the first grommet 202 may also be an electrically insulating interface between the dashboard 206 and the electrical connector 210.

The second grommet 204 may have a continuous structure with a different geometry than the first grommet 202 and may be configured to accommodate a shape of a cable harness 214. The second grommet 204 may therefore include a plurality of receiving apertures 216 to accommodate insertion of more than one electrical cable and/or electrical connector therethrough. Each of the plurality of receiving apertures 216 may have a geometry to match a geometry of a specific electrical cable/connector of the cable harness 214, such as circular, rectangular, etc., and may extend through protruding portions 218 of the second grommet 204. The second grommet 204 may include a planar base 217 that is co-planar with the surface of the dashboard 206 and in face-sharing contact with the surface of the dashboard 206. The planar base 217 may be coupled to the protruding portions 218, which may protrude perpendicularly away from the planar base 217 in a direction away from the dashboard 206 as well as an opposite direction, through corresponding openings in the dashboard 206. The protruding portions 218 may extend at least along a portion of a length or sides of each of the electrical cables/connectors of the cable harness 214 in the direction away from the dashboard 206. The protruding portions 218 may couple the planar base 217 to a similarly shaped planar section 219 arranged on an opposite side of the dashboard 206 to assist in maintaining a position of the second grommet 204 within the opening of the dashboard 206.

Each section/portion of the second grommet 204 may have a thickness 220 that is similar to or thinner than a thickness of the material of the dashboard 206. In one example, the thickness 220 of the second grommet 204 may be similar to the thickness 212 of the first grommet 202. Regardless of a specific geometry of each grommet, the grommets may be formed of relatively thin sections of material such that the grommets occupy sufficient volume in an opening of the dashboard 206 to maintain the cable harness or electrical connector immobile within its respective receiving apertures or central opening without being overly bulky. Additionally, the grommets lack any sharp corners or edges, and therefore include only curved and rounded edges. The second grommet 204 may provide a flexible, deformable interface between the dashboard 206 and the cable harness 214, allowing the cable harness 214 to extend through the dashboard 206 while shielding the cable harness 214 from contact with hard surfaces and securing the position of the cable harness 214. As described above, the second grommet 204 may also have a higher electrical resistance than a material of the cable harness 214.

In addition, the grommets may include various cut-outs to accommodate adjacent components coupled to the dashboard. For example, the second grommet 204 includes a semi-circular cut-out 222 such that the cut-out 222 abuts a perimeter of port 224 but does not cover the port 224.

In addition to grommets, the flexible supports may include spacers used as an interface between two or more adjacent components. For example, as shown in FIG. 3, a first pipe 302 located in the under-hood of the vehicle, e.g., the vehicle 100 of FIG. 1, may be positioned in close proximity to a second pipe 304. During vehicle operation, vehicle motion may induce oscillating movement of the first pipe 302 and the second pipe 304, such as vibrations, bouncing, etc., which may cause forceful contact between the pipes. To mitigate wear on the pipes resulting from the contact, one or more of the pipes may be configured with a flexible support. For example, as shown in FIG. 3, the second pipe 304 may be adapted with a spacer 306.

The spacer 306 may be formed of a more flexible and deformable material than a material of the first pipe 302 or a material of the second pipe 304. In one example, the spacer 306 may be formed of a same material as the first and second grommets 202, 204 of FIG. 2. The spacer 306 may be a sleeve circumferentially surrounding at least a portion of a length of the second pipe 304 and may have a thickness 308, e.g., defined along a radial direction, that is configured to absorb and dampen forces exerted on the second pipe 304 by contact with the first pipe 302. In one example, the thickness 308 of the spacer 306 may be adapted to be similar to a distance between the second pipe 304 and the first pipe 302. In another example, the thickness of the spacer may be similar to the thickness of the grommets depicted in FIG. 2.

While the spacer 306 is depicted to entirely surround a circumference of the second pipe 304 in FIG. 3, other examples may include variations in a geometry of the spacer 306 without departing from the scope of the present disclosure. For example, the spacer may instead surround only a portion of the circumference of the pipe or may not have a circular cross-sectional shape, or may have a different length, thickness, surface texturing, etc. For example, as shown in FIG. 3, an inner surface of the spacer 306 that is in face-sharing contact with a surface of the second pipe 304 includes ridges or splines to increase friction between the spacer 306 and the second pipe 304, thereby inhibiting slipping and sliding of the spacer 306. In other examples, the spacer may be maintained in place by an adhesive. In yet other examples, the inner surface of the spacer 306 may have a different types of texturing or may not be textured. Furthermore, the texturing may extend across the entire inner surface of the spacer 306 or across only a portion of the inner surface.

A positioning of flexible supports, such as the first and second grommets 202, 204 shown in FIG. 2 and the spacer 306 shown in FIG. 3, as well as various flexible supports arranged in a region between an under-hood or underbody of a vehicle and a vehicle passenger compartment, may be exposed to heat generated by components in the under-hood and/or underbody. By forming the flexible supports from a material with a high heat tolerance, fatigue and embrittlement of the flexible supports is reduced. However, conventional materials with a high maximum design temperature (MDT) may impose high costs. For example, a silicone rubber may have a MDT of 225 degrees C. but may be twice as costly as an ethylene propylene diene monomer (EPDM) rubber which may have a lower MDT of 150 degrees C. As exhaust components may reach temperatures between 100-300 degrees C., in some instances, use of the EPDM rubber for flexible supports in close proximity to exhaust components, e.g., in the underbody of the vehicle, may provide insufficient heat tolerance. While forming the flexible supports from silicone rubber may increase a robustness of the flexible supports, a corresponding increase in costs may decrease a consumer appeal of the vehicle.

To address the issues described above, a composite material may be used to form the flexible supports which may include dispersing an additive, which may be incorporated as a filler, into an elastomer or polymer matrix of the material, the additive having a lower optical and thermal absorptivity than the polymer matrix. In one example, the additive may be particles formed of aluminum (Al) or an Al alloy with diameters less than 100 μm and a density that is higher than a density of the polymer matrix. By using a relatively high density additive, a small volume of the particles may be added, e.g., compared to an additive with a similar density as the polymer matrix, to achieve a desired thermal characteristic of the composite while retaining mechanical properties of the polymer matrix. Furthermore, the polymer matrix may have a thermal absorptivity, for example, of 0.7 to 1.0 while the Al particles may have a thermal absorptivity of 0.2 to 0.4. Thus mixing of the Al particles into the polymer matrix may have an overall effect of the decreasing the thermal absorptivity of the resulting composite material relative to the polymer matrix.

Thermal absorptivity is an amount of heat penetrating a material during rapid temperature rise and given as a value between 0 and 1. When the material is in thermal equilibrium with its environment, the thermal absorptivity may be equal to a thermal emissivity of the material. Thus, the absorptivity may be determined by measuring the emissivity. As one example, the emissivity of the material may be determined using a device such as Leslie's cube in conjunction with a thermal radiation detector, such as a thermopile or bolometer. Thermal radiation from the material may be compared to thermal radiation from a nearly ideal, black sample and differences in radiation may be used to estimate the emissivity of the material. The thermal radiation detector may include highly sensitive thermometers that monitor a rise in the detector's temperature when exposed to thermal radiation.

The Al additive (where the Al additive includes both Al and Al alloy particles) may incur a minimal increase in cost compared to using EPDM alone. In one example, the Al additive may be obtained from waste materials, e.g., as a byproduct of industrial processes, and dispersed uniformly into the polymer matrix. Incorporation of the Al additive into the polymer matrix suppresses absorption of heat into the resulting composite material, thereby reducing thermal degradation of the composite material. Furthermore, by adjusting an amount of the Al additive in the composite material, physical properties of the composite material may be tuned to achieve a desired performance of the composite material.

For example, for flexible supports, such as grommets and spacers, where a capacity to tolerate and support heavy components is not demanded, the composite material may be configured to provide maximum thermal robustness while maintaining target mechanical properties, such as a tensile strength, an elongation, a tear resistance, a hardness, etc. A useful life of the flexible support may be prolonged without detracting from desired attributes of the polymer matrix.

The Al additive may be used as an additional filler or may at least partially replace a filler of the composite material, depending on properties and a cost of the filler relative to the Al additive. As example, the polymer composite may be an EPDM rubber mixed with various other chemical components as shown in Table 1 below.

TABLE 1

Comparison of composition of control polymer material with composite polymer material

| Ingredient | Control material (phr) | Composite material (phr) |
|---|---|---|
| EPDM | 100 | 100 |
| Paraffinic oil | 70 | 70 |
| Carbon black | 105 | 65-105 |
| Al particles | 0 | 10-50 |
| Coupling agent | 0 | 1-15% (total Al weight) 1-40% (total Al volume) |
| Zinc oxide | 5.0 | 5.0 |
| Stearic acid | 1.5 | 1.5 |
| Tetramethylthiuram disulfide (TMTD) | 1.0 | 1.0 |
| Zinc dibutyldithiocarbamate (Butazate) | 1.8 | 1.8 |
| Naugex ®MBTSW (MBTS) | 3.0 | 3.0 |
| Sulfur | 0.8 | 0.8 |

As shown in Table 1, a composition of a control polymer material (e.g., no Al additive incorporated) is compared with a composition of a composite polymer material with values of chemical ingredients given in parts per hundred rubber (phr). When the Al additive is included in the composition, an amount of carbon black, a filler used to increase an abrasion resistance, modulus, tear/tensile strength of the polymer material, etc., may be adjusted proportionally. For example, as the Al content increases, the carbon black content may decrease. Thus the Al additive may at least partially replace a filler used in a polymer material. Incorporation of the Al additive may also include adding a coupling agent to increase a cohesion between the Al additive and a polymer matrix of the polymer material. An amount of the coupling agent added to the composite polymer material may vary according to a volume or weight content of the Al additive.

As described above, the Al additive may at least partially replace another filler of the composite polymer material. A proportion of the Al additive relative to the filler may be selected based on desired physical properties of the composite polymer material. For example, the Al additive content may be determined based on a balance between abrasion/tear resistance and a thermal absorptivity of the material. For example, when used in flexible supports, such as the grommets illustrated in FIG. 2 and the spacer depicted in FIG. 3, application of the flexible supports may not demand as high of a resistance to abrasion and tearing as, for example, flexible supports included in engine mounts. In such instances, decreased thermal absorptivity of the material may be desired and the proportion of Al additive may be increased.

In other examples, however, application of the flexible supports may demand high abrasion and tear resistance as well as reduced thermal absorptivity. The composite polymer material may incorporate a maximum amount of the carbon black, e.g., 100 phr as shown in Table 10, and include the Al additive as an additional filler. For examples, in instances where a high tensile strength and tear resistance is demanded, the carbon black content (or silica, in other examples) may be maximized, e.g., 105 phr, and the Al additive may be added in a suitable quantity. However, in instances where a high hardness of the composite material is desired and low tensile and tear resistance is demanded, partial or even full replacement of the carbon black may be implemented.

As such, physical properties of the composite polymer material may be selectively tuned by adjusting the Al additive content as well as amounts of other fillers. Furthermore, a density of the Al additive may be greater than a density of the polymer matrix of the composite polymer material. A small proportion of the Al additive may enable an effective decrease in the thermal absorptivity of the composite polymer material. By using a small amount of the Al additive as either an additional filler or to at least partially substitute for another filler, less dilution of the polymer matrix is effected, thereby retaining properties of the polymer matrix. For example, in instances where durability and elasticity of the composite polymer material is demanded to support heavy loads and/or tolerate high shear stress, dilution of the polymer matrix may be minimized while decreasing a thermal/optical absorptivity of the material by incorporating the Al additive.

In some examples, such as when the flexible support is a grommet used to support electrical conductors, cables, harnesses, etc., it may be desirable to use a less electrically conductive filler than carbon black. Furthermore, the Al additive content may be reduced due to a conductivity of the Al particles. For example, a composite polymer material may have a composition shown in Table 2 below.

TABLE 2

Example composition for a composite polymer material with low electrical conductivity

| Ingredient | Amount (phr) |
| --- | --- |
| EPDM | 100 |
| Paraffinic oil | 70 |
| Ground calcium carbonate | 150 |
| Zinc oxide | 5 |
| Stearic acid | 1 |
| Peroxide activator | 2 |
| Peroxide cure | 7 |

In the example composition depicted in Table 2, a larger amount of a high volume resistivity filler (ground calcium carbonate) may be used than, for example, the amount of carbon black shown in Table 1. The resulting composite polymer material may be used in applications where tolerance for heavy loads/high stress is not demanded, thus a polymer matrix of the material may be diluted with fillers without decreasing a usefulness of the flexible support. By diluting the polymer matrix, less polymer may be used, thereby reducing costs.

Furthermore, the Al additive may be added to the ingredients of Table 2 either as an additional filler or to at least partially replace another filler, such as the ground calcium carbonate. As an example, 1-20% by volume of Al particles may be added. The range of the Al additive content (e.g., 1-20%) may be lower than the example composition shown in Table 1 to maintain a volume resistivity of the composite polymer material above a threshold, such as a volume resistivity per ASTM-D257 above $10^{12}$ mΩ.

Due to the electrical resistivity of the ground calcium carbonate, a relatively small quantity of the Al additive may be used to obtain sufficient decreased thermal absorptivity of the composite material to reduce degradation of the composite material. Furthermore, the ground calcium carbonate may be less costly than other fillers such as carbon black, for example. As such, the Al additive may be used to replace a portion of the ground calcium carbonate rather than incorporation as an additional filler.

The use of Al particles as an additive/filler in a low cost polymer material may form a material with similar physical properties as a costly material with a higher MDT, such as silicone rubber. For example, a silicone rubber with a durometer measurement of 50, a tensile strength of 6 MPa, an inherent volume resistivity of greater than $10^{12}$ mΩ (according to ASTM-D257), and a low temperature resistance (e.g., as measured by a brittleness of the material after soaking for 3 minutes at −55 deg C.), may be desirable for flexible supports used in a vehicle. As an alternative, a composite polymer material with a composition similar to the example composition shown in Table 2 may be used to provide a similar ability to support electrical components but at lower cost.

In this way, Al particles may be added to a polymer to form a composite material with high resistance to thermal degradation. By forming flexible supports from the composite material, the flexible supports may be grommets used to brace electrical components, such as connectors, harnesses, cables, etc., of a vehicle and maintain a position of the electrical components within the vehicle. The flexible supports may also be spacers used to shield components prone to movement, such as pipes, from direct contact with adjacent components. An amount of the Al particles incorporated into the composite material, as well as other fillers, may be adjusted according to an application of the flexible supports. For example, in order to maintain a high volume resistivity, less of the Al particles may be added than for flexible supports that are not in direct contact with the electrical components. The Al particles may be obtained from waste or scrap aluminum to maintain manufacturing costs low and may decrease a thermal absorptivity of the polymer, thereby reducing heat transmitted to the flexible supports from nearby, heat-generating vehicle parts. Desirable physical attributes of the flexible supports are enhanced or at least maintained while useful lifetimes of the flexible supports are prolonged.

The disclosure also provides support for a flexible support for a vehicle, comprising: a composite material forming the flexible support, the flexible support configured to at least partially surround a vehicle component and absorb oscillations generated by the vehicle, and wherein the composite material is a mixture of aluminum particles dispersed in an elastomer matrix. In a first example of the system, the flexible support is a grommet and the vehicle component is an electrical component and wherein the electrical component is inserted through a central opening of the grommet. In a second example of the system, optionally including the first example, the flexible support is a spacer and the vehicle component is a pipe and wherein the spacer circumferentially surrounds the pipe to block contact between the pipe and an adjacent pipe. In a third example of the system, optionally including one or both of the first and second examples, the aluminum particles are formed of pure aluminum or an aluminum alloy. In a fourth example of the system, optionally including one or more or each of the first through third examples, the composite material has a lower thermal absorptivity than the elastomer matrix. In a fifth example of the system, optionally including one or more or each of the first through fourth examples, the composite material includes 1-20% by volume of the aluminum particles. In a sixth example of the system, optionally including one or more or each of the first through fifth examples, the aluminum particles have a higher density than the elastomer matrix.

The disclosure also provides support for a supporting device, comprising: a composite material formed of aluminum particles dispersed in an elastomer, the elastomer having a higher thermal absorptivity than the aluminum particles, wherein the supporting device is configured for one or more of maintaining a position of an electrical component and shielding an object from surrounding objects. In a first example of the system, the composite material includes one or more coupling agents configured to increase a cohesion between the aluminum particles and the elastomer. In a second example of the system, optionally including the first example, the aluminum particles have a diameter of less than 100 microns. In a third example of the system, optionally including one or both of the first and second examples, the composite material absorbs less heat than the elastomer. In a fourth example of the system, optionally including one or more or each of the first through third examples, the aluminum particles reduce a temperature of the composite material when the supporting device is exposed to heat.

The disclosure also provides support for a vehicle, comprising: an under-hood region and an underbody region, one or more components extending through one or more of the under-hood region and the underbody region within a heating radius of a heat-generating device, and at least one flexible support formed of an aluminum particle/elastomer composite and coupled to the one or more components to maintain a position of the one or more components and/or shield the one or more components from direct contact with adjacent components. In a first example of the system, the at least one flexible support is a grommet configured to guide an extension of the one or more components through the under-hood region and/or the underbody region. In a second example of the system, optionally including the first example, the at least one flexible support is a spacer configured as a sleeve surrounding the one or more components. In a third example of the system, optionally including one or both of the first and second examples, an elastomer matrix of the aluminum particle/elastomer composite has a thermal absorptivity of 0.7 to 1.0. In a fourth example of the system, optionally including one or more or each of the first through third examples, aluminum particles of the aluminum particle/elastomer composite have a thermal absorptivity of 0.2 to 0.4. In a fifth example of the system, optionally including one or more or each of the first through fourth examples, the aluminum particles are dispersed in the aluminum particle/elastomer composite as a filler in addition to other fillers of the aluminum particle/elastomer composite. In a sixth example of the system, optionally including one or more or each of the first through fifth examples, the aluminum particles are dispersed in the aluminum particle/elastomer composite to at least partially replace another filler of the aluminum particle/elastomer composite. In a seventh example of the system, optionally including one or more or each of the first through sixth examples, a volume resistivity of the aluminum particle/elastomer composite is above 1012 mΩ per ASTM-D257.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A flexible support for a vehicle, comprising:
a composite material forming the flexible support, the flexible support configured to at least partially surround a vehicle component and absorb oscillations generated by the vehicle, wherein the composite material is a mixture of aluminum particles dispersed in an elastomer matrix, and wherein the aluminum particles partially replace another filler of the composite material having a different thermal absorptivity and/or electrical resistivity than the aluminum particles and being a different material than aluminum, the replacement of the another filler modifying an abrasion resistance and/or electrical resistivity of the flexible support.

2. The flexible support of claim 1, wherein the flexible support is a grommet and the vehicle component is an electrical component, and wherein the electrical component is inserted through a central opening of the grommet.

3. The flexible support of claim 1, wherein the flexible support is a spacer and the vehicle component is a pip; and wherein the spacer circumferentially surrounds the pipe to block contact between the pipe and an adjacent pipe.

4. The flexible support of claim 1, wherein the aluminum particles are formed of pure aluminum or an aluminum alloy, and wherein the composite material has a lower thermal absorptivity than the elastomer matrix.

5. The flexible support of claim 1, wherein the composite material includes 1-20% by volume of the aluminum particles.

6. The flexible support of claim 1, wherein the aluminum particles have a higher density than the elastomer matrix.

7. A supporting device, comprising:
a composite material formed of aluminum particles dispersed in an elastomer, the elastomer having a higher thermal absorptivity than the aluminum particles, wherein the supporting device is configured for one or more of maintaining a position of an electrical component and shielding an object from surrounding objects, wherein the aluminum particles partially replace other fillers of the composite material having a different thermal absorptivity and/or electrical resistivity than the aluminum particles to modify an abrasion resistance and/or electrical resistivity of the composite material, and wherein the aluminum particles are a filler in addition to the other fillers of the aluminum particles, the other fillers being carbon black and ground calcium carbonate.

8. The supporting device of claim 7, wherein the composite material includes one or more coupling agents configured to increase a cohesion between the aluminum particles and the elastomer.

9. The supporting device of claim 8, wherein the aluminum particles have a diameter of less than 100 microns.

10. The supporting device of claim 9, wherein the composite material absorbs less heat than the elastomer.

11. The supporting device of claim 7, wherein the aluminum particles reduce a temperature of the composite material when the supporting device is exposed to heat.

12. A vehicle, comprising:
an under-hood region and an underbody region;
one or more components extending through one or more of the under-hood region and the underbody region within a heating radius of a heat-generating device; and
at least one flexible support formed of an aluminum particle/elastomer composite and coupled to the one or more components to maintain a position of the one or more components and shield the one or more components from direct contact with adjacent components, wherein aluminum particles of the aluminum particle/elastomer composite partially replace another filler of the aluminum particle/elastomer composite having a different thermal absorptivity and/or electrical resistivity than the aluminum particles to modify an abrasion resistance and/or electrical resistivity of the at least one flexible support, and wherein the aluminum particle/elastomer composite is a filler in addition to the another fillers of the aluminum particle/elastomer composite, the another filler being carbon black or ground calcium carbonate.

13. The vehicle of claim 12, wherein the at least one flexible support is a grommet configured to guide an extension of the one or more components through the under-hood region and/or the underbody region.

14. The vehicle of claim 12, wherein the at least one flexible support is a spacer configured as a sleeve surrounding the one or more components.

15. The vehicle of claim 12, wherein an elastomer matrix of the aluminum particle/elastomer composite has a thermal absorptivity of 0.7 to 1.0.

16. The vehicle of claim 12, wherein the aluminum particles of the aluminum particle/elastomer composite have a thermal absorptivity of 0.2 to 0.4.

17. The vehicle of claim 12, wherein the aluminum particles are uniformly dispersed in the aluminum particle/elastomer composite.

18. The vehicle of claim 12, wherein a volume resistivity of the aluminum particle/elastomer composite is above $10^{12}$ mΩ per ASTM-D257.

* * * * *